(12) United States Patent
Noh (10) Patent No.: US 11,516,577 B2
(45) Date of Patent: Nov. 29, 2022

(54) VEHICLE, AND METHOD OF CONTROLLING THE SAME

(71) Applicants: Hyundai Motor Company, Seoul (KR); Kia Corporation, Seoul (KR)

(72) Inventor: Jung Uk Noh, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 17/526,165

(22) Filed: Nov. 15, 2021

(65) Prior Publication Data

US 2022/0174400 A1 Jun. 2, 2022

(30) Foreign Application Priority Data

Nov. 27, 2020 (KR) .................. 10-2020-0163081

(51) Int. Cl.
| | |
|---|---|
| *H04R 1/28* | (2006.01) |
| *H04R 1/02* | (2006.01) |
| *H04R 3/00* | (2006.01) |
| *G01K 1/02* | (2021.01) |
| *B60R 11/02* | (2006.01) |

(52) U.S. Cl.
CPC .......... *H04R 1/2826* (2013.01); *G01K 1/026* (2013.01); *H04R 1/023* (2013.01); *H04R 1/025* (2013.01); *H04R 3/00* (2013.01); *B60R 11/0217* (2013.01); *H04R 2499/13* (2013.01)

(58) Field of Classification Search
CPC ...... H04R 1/2826; H04R 1/023; H04R 1/025; H04R 3/00; H04R 2499/13; G01K 1/026; B60R 11/0217
USPC .......................................................... 381/86
See application file for complete search history.

(56) References Cited

U.S. PATENT DOCUMENTS

| | | | |
|---|---|---|---|
| 2007/0286449 A1* | 12/2007 | Matsumura .......... | H04R 1/2803 381/433 |
| 2008/0037803 A1* | 2/2008 | Breed ...................... | H04R 5/02 381/86 |
| 2009/0028370 A1* | 1/2009 | Matsumura ............ | H04R 3/002 381/86 |

* cited by examiner

*Primary Examiner* — Sean H Nguyen
(74) *Attorney, Agent, or Firm* — Fox Rothschild LLP

(57) ABSTRACT

A vehicle and a method of controlling the same maintain a constant resonant frequency of an enclosure even when the external and internal temperature of the vehicle changes by changing the length or cross-sectional area of a port of an enclosure provided in the vehicle. The vehicle includes a first sensor that measures an external temperature of the vehicle, a housing, and a speaker that is provided inside the housing and arranged to face an opening formed at one surface of the housing. A pipe is provided in the housing and arranged to have an opening thereof face a hole formed at the one surface of the housing. A driving part changes a volume of the pipe and a controller operates the driving part to change the volume of the pipe based on the external temperature of the vehicle.

18 Claims, 10 Drawing Sheets

VEHICLE, AND METHOD OF CONTROLLING THE SAME

CROSS-REFERENCE TO RELATED APPLICATION

This application is based on and claims priority under 35 U.S.C. § 119 to Korean Patent Application No. 10-2020-0163081, filed on Nov. 27, 2020, the disclosure of which is incorporated herein by reference.

BACKGROUND

1. Field of the Disclosure

The disclosure relates to a vehicle and a method of controlling the same, and more specifically, to a vehicle including an enclosure capable of providing optimal performance regardless of the temperature, and a method of controlling the same.

2. Description of the Related Art

In general, a vehicle refers to a device for movement or transportation, designed to travel on a road or railway using fossil fuel, electric power, and the like as a power source. For example, the vehicle may be driven using power generated by an engine. Recently, a vehicle capable of providing various functions in consideration of user convenience is being developed. The vehicle includes an electric device, such as a speaker device, to protect the driver and provide convenience and fun to the driver.

In a typical speaker device, a speaker unit for outputting sound is mounted in an enclosure having a box shape. The sound of the speaker unit may be distorted due to interference between the sound generated from the front of the diaphragm and the sound from the rear of the diaphragm. The enclosure prevents interference between the front sound and the rear sound of the speaker unit, enabling high quality sound to be output. In addition, a resonance space inside the enclosure may enhance the sound quality by reinforcing the bass.

SUMMARY

Therefore, it is an object of the disclosure to provide a vehicle capable of maintaining a constant resonant frequency of an enclosure even when the external and internal temperature of the vehicle changes by changing the length or cross-sectional area of a port of an enclosure provided in the vehicle, and a method of controlling the same.

Additional aspects of the disclosure will be set forth in part in the description which follows and, in part, will be obvious from the description, or may be learned by practice of the disclosure.

According to an aspect of the disclosure, a vehicle may include: a first sensor configured to measure an external temperature of the vehicle; a housing; a speaker provided inside the housing and arranged to face an opening formed at one surface of the housing; a pipe provided in the housing and arranged to have an opening thereof face a hole formed at the one surface of the housing; a driving part configured to change a volume of the pipe; and a controller configured to operate the driving part to change the volume of the pipe based on the external temperature of the vehicle.

The vehicle may further include a second sensor configured to measure an internal temperature of the vehicle, wherein the controller may be configured to operate the driving part to change the volume of the pipe based on the internal temperature of the vehicle. The controller may be configured to estimate an internal temperature of the housing based on the external temperature of the vehicle and the internal temperature of the vehicle, and operate the driving part to change the volume of the pipe based on the estimated internal temperature of the housing. The controller may be configured to operate the driving part to change the length of the pipe based on at least one of the external temperature of the vehicle or the internal temperature of the vehicle.

The vehicle may further include a screen arranged inside the housing to have a first side in close contact with a left side surface of the housing and a second side in close contact with a right side surface of the housing, wherein the pipe may include the left side surface of the housing, the right side surface of the housing, a bottom surface of the housing, and the screen, the driving part may move the screen in a direction parallel to the bottom surface to change the length of the pipe, and the controller may be configured to operate the driving part to move the screen based on at least one of the external temperature of the vehicle or the internal temperature of the vehicle.

The vehicle may further include a cover provided inside the housing to be movable in a direction parallel to a bottom surface of the housing, wherein the pipe may include the bottom surface and the cover, the driving part may move the cover such that the length of the pipe is changed, and the controller may be configured to operate the driving part to move the cover based on at least one of the external temperature of the vehicle or the internal temperature of the vehicle. The controller may be configured to operate the driving part to change a cross-sectional area of the pipe based on at least one of the external temperature of the vehicle or the internal temperature of the vehicle.

The vehicle may further include a screen arranged inside the housing to have a first side in close contact with a left side surface of the housing and a second side in close contact with a right side surface of the housing, wherein the pipe may include the left side surface of the housing, the right side surface of the housing, a bottom surface of the housing, and the screen, the driving part may move the screen in a direction perpendicular to the bottom surface to change the cross-sectional area of the pipe, and the controller may be configured to operate the driving part to move the screen based on at least one of the external temperature of the vehicle or the internal temperature of the vehicle.

The vehicle may further include a cover provided inside the housing to be movable in a direction perpendicular to a bottom surface of the housing, wherein the pipe may include the bottom surface and the cover, the driving part may move the cover to change the cross-sectional area of the pipe, and the controller may be configured to operate the driving part to move the cover based on at least one of the external temperature of the vehicle or the internal temperature of the vehicle.

According to an aspect of the disclosure, a method of controlling a vehicle including a housing, a speaker provided inside the housing and arranged to face an opening formed at one surface of the housing, and a pipe provided in the housing and arranged to have an opening thereof face a hole formed at the one surface of the housing, the method may include: measuring an external temperature of the vehicle; and operating a driving part to change a volume of the pipe based on the external temperature of the vehicle.

The method may further include measuring an internal temperature of the vehicle, wherein the operating of the driving part to change the volume of the pipe may include operating the driving part to change the volume of the pipe based on the internal temperature of the vehicle. The operating of the driving part to change the volume of the pipe may include estimating an internal temperature of the housing based on the external temperature of the vehicle and the internal temperature of the vehicle, and operating the driving part to change the volume of the pipe based on the estimated internal temperature of the housing. Additionally, the operating of the driving part to change the volume of the pipe may include operating the driving part to change the length of the pipe based on the external temperature of the vehicle.

The vehicle may further include a screen arranged inside the housing to have a first side in close contact (proximate) with a left side surface of the housing and a second side in close contact (proximate) with a right side surface of the housing, wherein the pipe may include the left side surface of the housing, the right side surface of the housing, a bottom surface of the housing, and the screen, the driving part may move the screen in a direction parallel to the bottom surface to change the length of the pipe, and the operating of the driving part to change the length of the pipe may include operating the driving part to move the screen based on the external temperature of the vehicle.

The vehicle may further include a cover provided inside the housing to be movable in a direction parallel to a bottom surface of the housing, wherein the pipe may include the bottom surface and the cover, the driving part may move the cover such that the length of the pipe is changed, and the operating of the driving part to change the length of the pipe may include operating the driving part to move the cover based on the external temperature of the vehicle. The operating of the driving part to change the volume of the pipe may include operating the driving part to change a cross-sectional area of the pipe based on the external temperature of the vehicle.

The vehicle may further include a screen arranged inside the housing to have a first side in close contact with a left side surface of the housing and a second side in close contact with a right side surface of the housing, wherein the pipe may include the left side surface of the housing, the right side surface of the housing, a bottom surface of the housing, and the screen, the driving part may move the screen in a direction perpendicular to the bottom surface so that the cross-sectional area of the pipe is changed, and the operating of the cross-sectional area of the pipe may include operating the driving part to move the screen based on the external temperature of the vehicle.

The vehicle may further include a cover provided inside the housing to be movable in a direction perpendicular to a bottom surface of the housing, wherein the pipe may include the bottom surface and the cover, the driving part may move the cover such that the cross-sectional area of the pipe is changed, and the operating of the driving part to change the cross-sectional area of the pipe may include operating the driving part to move the cover based on the external temperature of the vehicle.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Like numerals refer to like elements throughout the specification. Not all elements of embodiments of the present disclosure will be described, and description of what are commonly known in the art or what overlap each other in the embodiments will be omitted. The terms as used throughout the specification, such as "~part", "~module", "~member", "~block", etc., may be implemented in software and/or hardware, and a plurality of "~parts", "~modules", "~members", or "~blocks" may be implemented in a single element, or a single "~part", "~module", "~member", or "~block" may include a plurality of elements.

It will be further understood that the term "connect" or its derivatives refer both to direct and indirect connection, and the indirect connection includes a connection over a wireless communication network.

It will be further understood that the terms "comprises" and/or "comprising," when used in this specification, specify the presence of stated features, integers, steps, operations, elements, and/or components, but do not preclude the presence or addition of one or more other features, integers, steps, operations, elements. In the specification, it will be understood that, when a member is referred to as being "on/under" another member, it may be directly on/under the other member, or one or more intervening members may in addition be present.

Although the terms "first," "second," "A," "B," etc. may be used to describe various components, the terms do not limit the corresponding components, but are used only for the purpose of distinguishing one component from another component. As used herein, the singular forms "a," "an" and "the" are intended to include the plural forms as well, unless the context clearly indicates otherwise. Reference numerals used for method steps are just used for convenience of explanation, but not to limit an order of the steps. Thus, unless the context clearly dictates otherwise, the written order may be practiced otherwise.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

Hereinafter, the principles and embodiments of the disclosure will be described with reference to the accompanying drawings.

Figure 1:
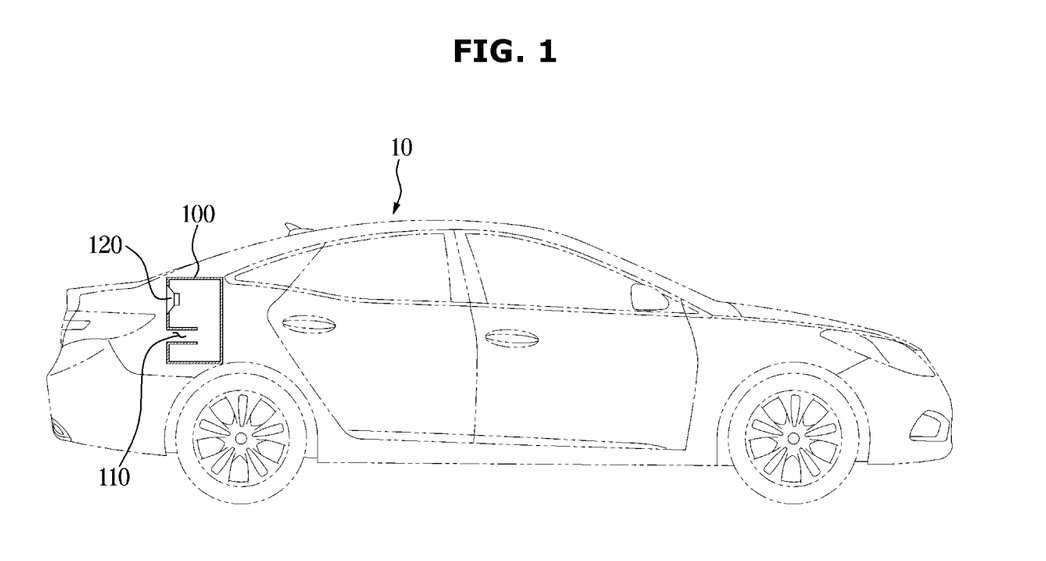
FIG. 1 is a diagram illustrating a vehicle according to an embodiment.
Figure 2:
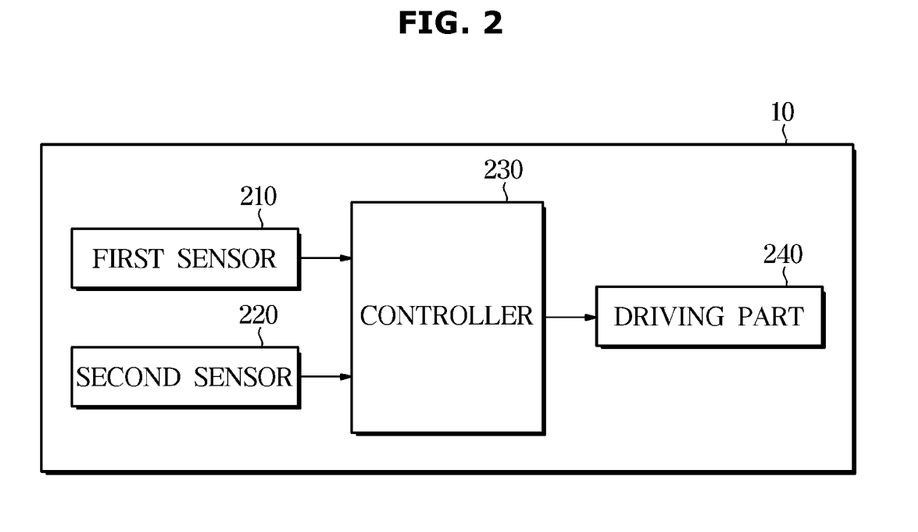
FIG. 2 is a control block diagram illustrating a vehicle according to an embodiment.
Figure 3:
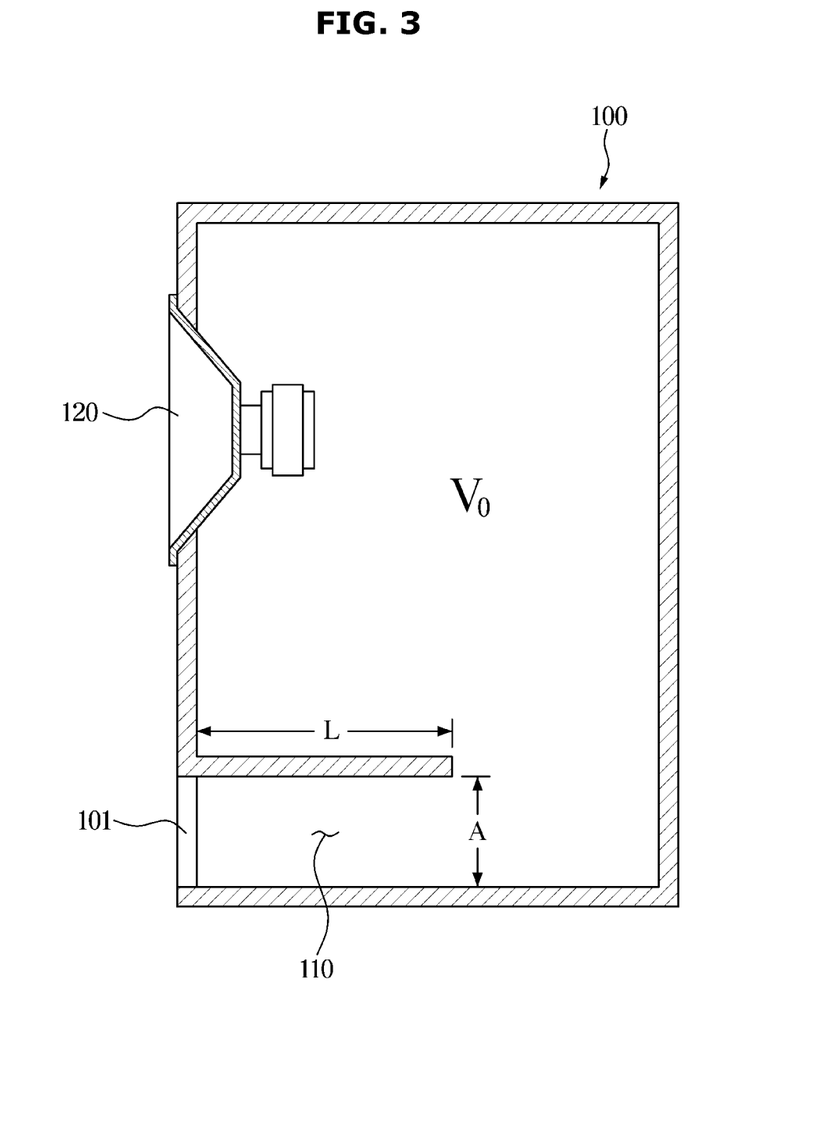
FIG. 3 is a cross-sectional view illustrating a housing provided in a vehicle according to an embodiment.

FIG. 1 is a diagram illustrating a vehicle according to an embodiment, FIG. 2 is a control block diagram illustrating a vehicle according to an embodiment, and FIG. 3 is a cross-sectional view illustrating a housing provided in a vehicle according to an embodiment. Referring to FIGS. 1 and 2, a vehicle 10 according to the disclosed embodiment may include a housing 100 accommodating a pipe 110 and a speaker 120. In addition, the vehicle 10 may include a first sensor 210, a second sensor 220, a controller 230, and a driving part 240.

The housing 100 may be an enclosure forming an empty space therein. The housing 100 may have a hole 101 formed at one surface thereof, so that air may pass between the empty space inside the housing 100 and the outside of the housing 100. In other words, the housing 100 may be a bass-reflex type enclosure provided at one surface thereof with the hole 101 so that bass reflected from the inside is reused.

The housing 100 may be a vented-box enclosure including a port having a particular cross-section and length among bass-reflex type enclosures. When a diaphragm of the speaker 120 vibrates, the vented-box type enclosure reverses the phase of the sound output to the rear side of the speaker 120 and outputs the sound out of the port so that the sound output out of the port is added to the sound output to the front through the speaker 120, producing improved bass. The pipe 110 may be a port through which air inside the housing 100 is discharged to the outside to more easily produce a bass sound. In other words, the pipe 110 may improve the bass performance of the speaker 120 and the housing 100. The shape of the pipe 110 may be provided in any shape as long as it capable of allowing air to pass therethrough. Preferably, the cross-sectional area of the pipe 110 and area of the hole 101 may be equal to each other.

The speaker 120 may be configured to output an electrical signal received from an amplifier (AMP) as sound. Specifically, the speaker 120 may be configured to convert an electrical signal into a mechanical signal, and according to the mechanical signal, provide a sound pressure to output a sound. For example, the mechanical signal may include a vibration signal. The AMP may be configured to transmit an electrical signal to the speaker 120 and may supply power. The AMP may be configured to adjust the power to be supplied to the speaker 120 based on a control signal of the controller 230.

The first sensor 210 may be a temperature sensor configured to measure an external temperature outside of the vehicle 10. In particular, the first sensor 210 may be configured to transmit the measured temperature information outside of the vehicle 10 to the controller 230. The second sensor 220 may be a temperature sensor configured to measure an internal temperature inside of the vehicle 10. In particular, the second sensor 220 may be configured to transmit the measured temperature information inside of the vehicle 10 to the controller 230. The controller 230 may be configured to operate the driving part 240 to change the volume of the pipe 110 based on the external temperature of the vehicle 10.

According to another embodiment, the controller 230 may be configured to operate the driving part 240 to change the volume of the pipe 110 based on the internal temperature of the vehicle 10. The controller 230 may be configured to estimate the internal temperature of the housing 100 based on the internal temperature of the vehicle 10 and the external temperature of the vehicle 10, and operate the driving part 240 to change the volume of the pipe 110 based on the estimated internal temperature of the housing 100. The driving part 240 may be configured to change the volume of the pipe 110 based on a control signal of the controller 230.

According to an embodiment, the driving part 240 may be configured to change the volume of the pipe 110 by changing a length L of the pipe 110. According to another embodiment, the driving part 240 may be configured to change the volume of the pipe 110 by changing a cross-sectional area A of the pipe 110.

The memory may be configured to store a program for performing the above-described operation and an operation to be described below, and the controller 230 may execute the stored program. When the controller 230 and the memory are provided in plural, the controller 230 and the memory may be integrated in one chip, or may be provided in physically separate locations. The memory may include a volatile memory, such as a static random access memory (S-RAM) or a dynamic random access memory (D-RAM) for temporarily storing data. In addition, the memory includes a non-volatile memory, such as a Read Only Memory (ROM), an Erasable Programmable Read Only Memory (EPROM), and an Electrically Erasable Programmable Read Only Memory (EEPROM), for long-term storage of control programs and control data. The controller 230 may include various logic circuits and arithmetic circuits, process data according to a program provided from the memory, and generate a control signal according to a processing result.

Referring to FIG. 3, the housing 100 may be a Helmholtz resonator that forms an internal space having a constant volume $V_0$, and including a pipe 110 having a constant cross-sectional area A and a constant length L in the internal space. In particular, the housing 100 may be configured to vibrate with a maximum efficiency for a sound of a specific frequency. In other words, the housing 100 may be provided to resonate with a sound of a resonant frequency $f_H$, which is a specific frequency.

Particularly, the relationship between the resonant frequency $f_H$, the cross-sectional area A of the pipe 110, the length L of the pipe 110, and the volume $V_0$ of the housing 100 is as shown in Equation 1 below.

$$f_H = \frac{v}{2\pi}\sqrt{\frac{A}{V_0 L}} \quad \text{[Equation 1]}$$

The resonant frequency $f_H$ may be affected not only by the structural characteristics of the housing 100 and the pipe 110, but also by the characteristics of the air inside the housing 100 and the pipe 110. Specifically, referring to Equation 1, the resonant frequency $f_H$ of the housing 100 may also be affected by the sound velocity v of the internal air.

The sound velocity may vary depending on the temperature T of the air. The relationship between the sound velocity and the temperature T of air is expressed in Equation 2 below.

$$V(m/s) = (331.3 + 0.606 \times T(° C.)) \quad \text{[Equation 2]}$$

Based on Equation 2, the sound velocity v is calculated as about 313.12 m/s at −30° C., and about 355.54 m/s at 40° C. In other words, the sound velocity v may have a variation of about 14% between the conditions of −30° C. and 40° C.

When the sound velocity changes according to the temperature T of the air as described above, and the resonant frequency $f_H$ changes according to the sound velocity, such a change may exert an influence on the frequency at which the housing 100 achieves maximum efficiency.

Devices such as an audio, a speaker, etc. are used only indoors, and thus the variation in frequency due to the temperature of the air may be minimal. However, vehicles may have a substantial difference of temperature conditions from minus 30 degrees Celsius to 40 degrees Celsius depending on the sales region or season. In particular, since resonance may not occur at a frequency intended when the housing 100 is manufactured, which may affect the sound quality.

To solve the above limitation, the disclosure may adjust the volume of the pipe 110 inside the housing 100 based on the external temperature of the vehicle 10 to adjust the resonant frequency $f_H$ of the housing 100. Specifically, referring to Equation 1, when the sound velocity v changes, and the remaining variables remain the same, the resonant frequency $f_H$ also changes. However, when the volume $V_0$ of the housing 100 and the cross-sectional area A and the length L of the pipe 110 are appropriately adjusted, the resonant frequency $f_H$ may be maintained constant.

Accordingly, even when the temperature T of the air, that is, the temperature $T_{enclosure}$ inside the housing 100 changes, the resonant frequency $f_H$ may be maintained constant by adjusting the cross-sectional area A and length L of the pipe 110, so that the housing 100 and the speaker may have optimal performance regardless of temperature conditions. Since the speaker is usually mounted on the inside of the exterior plate of the vehicle 10 and on the outside of the interior material, the temperature $T_{enclosure}$ inside the housing 100 may be affected by both the internal temperature of and the external temperature of the vehicle 10.

The controller 230 may be configured to estimate the internal temperature $T_{enclosure}$ of the housing 100 as an average value obtained by assigning appropriate weights to the internal temperature of the vehicle 1 and the external temperature of the vehicle 10. The relationship between the internal temperature $T_{enclosure}$ of the housing 100, the external temperature $T_{outside}$ of the vehicle 10, the internal temperature $T_{inside}$ of the vehicle 10, and the weight α is expressed by Equation 3 below.

$$T_{enclosure} = T_{outside} + \alpha \times (T_{outside} - T_{inside}) \quad \text{[Equation 3]}$$

In particular, the weight a may be set in advance as a value found through testing in the development process.

The controller 230 may be configured to estimate the internal temperature $T_{enclosure}$ of the housing 100 based on the external temperature $T_{outside}$ of the vehicle 10 measured by the first sensor 210, the internal temperature $T_{inside}$ of the vehicle 10 measured by the second sensor 220, the weight α, and Equation 3. The controller 230 may be configured to estimate the sound velocity v of the air inside the housing 100 when the estimated internal temperature of the housing 100 is $T_{enclosure}$, based on the internal temperature $T_{enclosure}$ of the housing 100 and Equation 2.

The controller 230 may be configured to determine the length L of the pipe 110 and the cross-sectional area A of the pipe 110 that may allow the resonant frequency $f_H$ to be maintained at the same value, based on the estimated sound velocity v of the air inside the housing 100 and Equation 1. The controller 230 may be configured to operate the driving part 240 to change the shape of the pipe 110 to have the determined length L of the pipe 110 and the determined cross-sectional area A of the pipe 110 so that the housing 100 and the speaker 120 provide optimal performance regardless of temperature conditions.

Figure 4A:
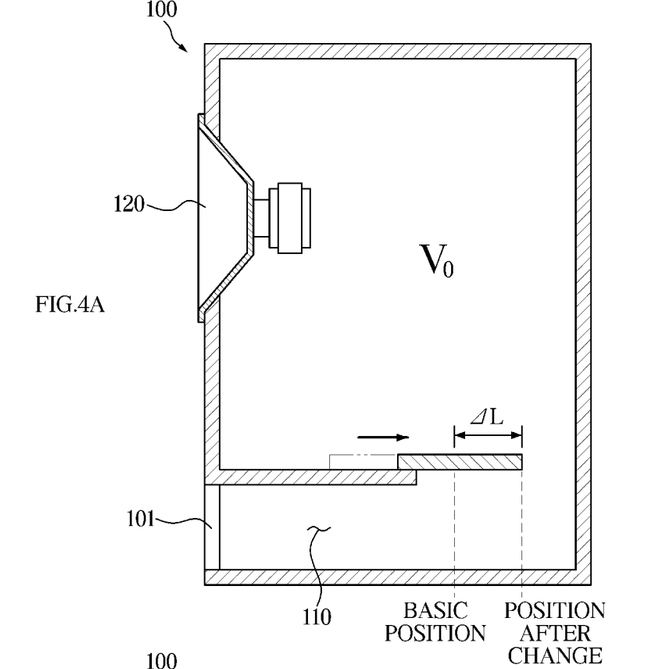
FIG. 4A is a cross-sectional view illustrating an embodiment of a housing in which the length of a pipe is increased.
Figure 4B:
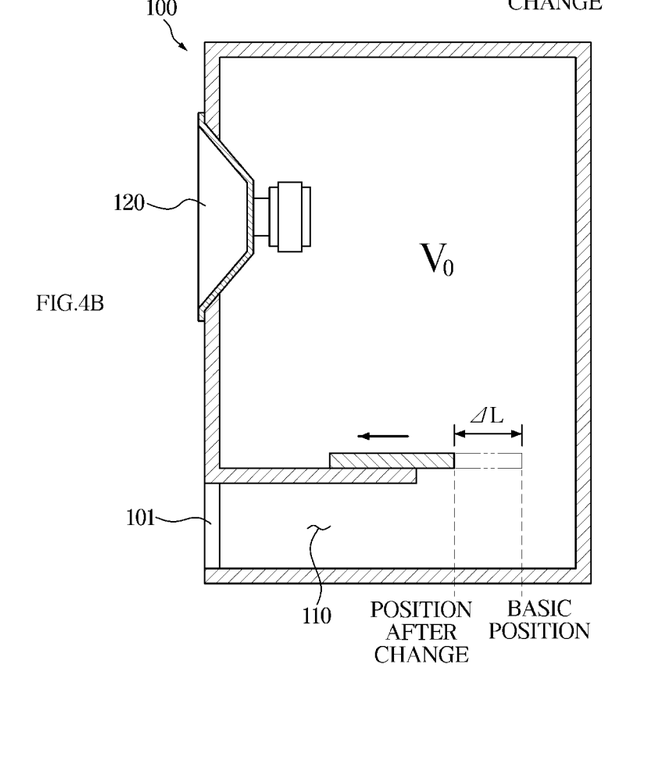
FIG. 4B is a cross-sectional view illustrating an embodiment of a housing in which the length of a pipe is reduced.

FIG. 4A is a cross-sectional view illustrating an embodiment of a housing in which the length of a pipe is increased, and FIG. 4B is a cross-sectional view illustrating an embodiment of a housing in which the length of a pipe is reduced. Referring to Equation 1, parameters that allow the resonant frequency $f_H$ to be maintained at the same value even when the sound velocity changes include the length L of the pipe 110 and the cross-sectional area A of the pipe 110. In FIGS. 4A and 4B, the cross-sectional area A of the pipe 110 and the area of the hole 101 are equal to each other. In particular, the resonant frequency $f_H$ may be maintained at the same value by changing the length L of the pipe 110 while maintaining the cross-sectional area A of the pipe 110 constant.

A basic sound velocity $v_{20° C.}$ may be a sound velocity v of air inside the housing 100 when the internal temperature $T_{enclosure}$ of the housing 100 is 20° C. A basic port length $L_{20° C.}$ may be a length L of the pipe 110 that has been not adjusted by the controller 230. A basic port length $L_{20° C.}$ may be a length of the pipe 110 at which an intended resonant frequency $f_H$ is output when the internal temperature $T_{enclosure}$ of the housing 100 is 20° C. A length change amount ΔL of the pipe 110 that is required when the internal temperature $T_{enclosure}$ of the housing 100 is not 20° C. may be expressed by Equation 4 by modifying Equation 1.

$$\Delta L = \left(\left(\frac{v_{T_{enclosure}}}{v_{20° C.}}\right)^2 - 1\right) L_{20° C.} \quad \text{[Equation 4]}$$

In other words, based on the basic port length $L_{20° C.}$, the basic sound velocity $v_{20° C.}$, the estimated internal temperature $T_{enclosure}$ of the housing 100, and Equation 4, the corresponding length change amount ΔL of the pipe 110 may be identified.

Accordingly, the length change amount ΔL of the pipe 110 corresponding to the internal temperature $T_{enclosure}$ of the housing 100 may be set in advance as a value found through tests during the development process. In other words, the length change amount ΔL of the pipe 110 corresponding to the internal temperature $T_{enclosure}$ of the housing 100 may be stored in the memory in advance.

The controller 230 may be configured to determine the length change amount ΔL of the pipe 110 corresponding to the internal temperature $T_{enclosure}$ of the housing 100 based on the internal temperatures $T_{enclosure}$ of the housing 100 and values stored in the memory. The controller 230 may be configured to operate the driving part 240 to change the length L of the pipe 110 having the basic port length $L_{20° C.}$ by the length change amount ΔL.

Referring to FIG. 4A, when the internal temperature $T_{enclosure}$ of the housing 100 is 20° C., at least one of a screen 130 or a cover 140 may be located at a basic position, and the length L of the pipe 110 may have the basic port length $L_{20°\ C.}$. When the internal temperature $T_{enclosure}$ of the housing 100 exceeds 20° C., the length L of the pipe 110 needs to increase by the length change amount L of the pipe 110 corresponding to the internal temperature $T_{enclosure}$ of the housing 100 so that the resonant frequency $f_H$ is maintained the same. In particular, the controller 230 may be configured to operate the driving part 240 so that the length L of the pipe 110 having the basic port length $L_{20°\ C.}$ increases by the length change amount ΔL.

Referring to FIG. 4B, when the internal temperature $T_{enclosure}$ of the housing 100 is less than 20° C., the length L of the pipe 110 needs to decrease by the length change amount ΔL corresponding to the internal temperature $T_{enclosure}$ of the housing 100 so that the resonant frequency $f_H$ may be maintained the same. In particular, the controller 230 may be configured to operate the driving part 240 so that the length L of the pipe 110 having the basic port length $L_{20°\ C.}$ decreases by the length change amount ΔL.

Meanwhile, although the above-described example is illustrated based on a case where the internal temperature $T_{enclosure}$ of the housing 100 is 20° C., this is only an example, and examples using other temperatures as a reference may be possible.

Figure 5A:
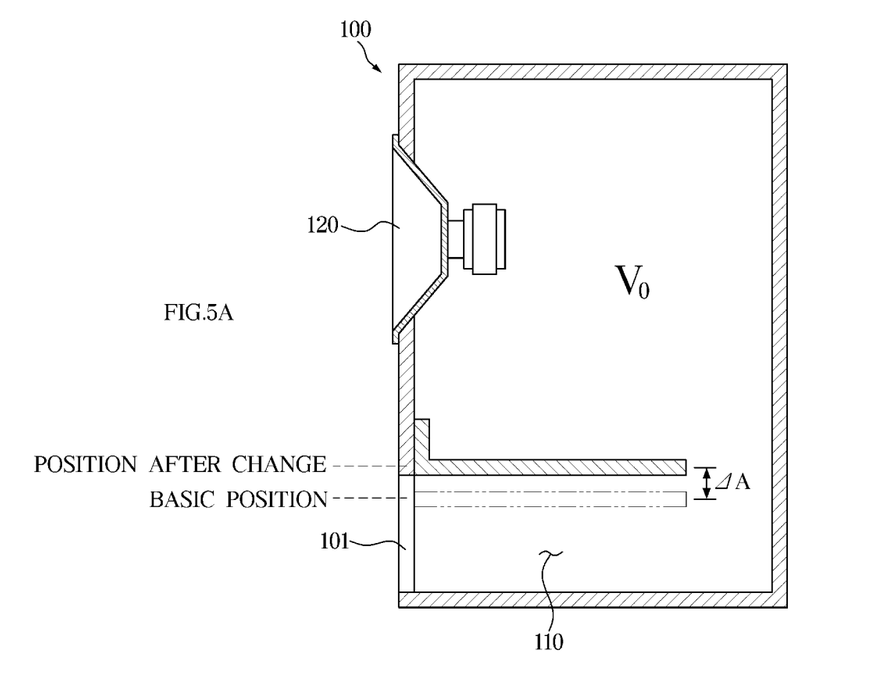
FIG. 5A is a cross-sectional view illustrating an embodiment of a housing in which the cross-sectional area of a pipe is increased.
Figure 5B:
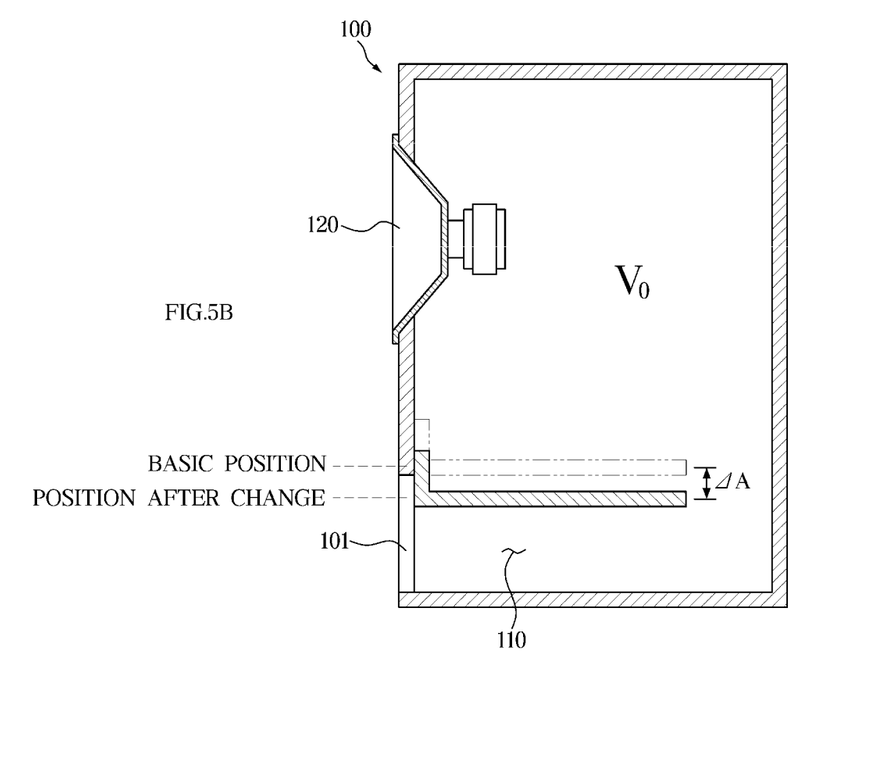
FIG. 5B is a cross-sectional view illustrating an embodiment of a housing in which the cross-sectional area of a pipe is reduced.

FIG. 5A is a cross-sectional view illustrating an embodiment of a housing in which the cross-sectional area of a pipe is increased, and FIG. 5B is a cross-sectional view illustrating an embodiment of a housing in which the cross-sectional area of a pipe is reduced. In FIGS. 5A and 5B, the cross-sectional area A of the pipe 110 and the area of the hole 101 are equal to each other. When the cross-sectional area A of the pipe 110 is changed, the area of the hole 101 is also changed. Referring to Equation 1, the resonant frequency $f_H$ may be maintained at the same value by changing the cross-sectional area A of the pipe 110 while maintaining the length L of the pipe 110 constant.

A basic port cross-sectional area $A_{20°\ C.}$ may be a cross-sectional area A of the pipe 110 that has not been adjusted by the controller 230. The basic port cross-sectional area $A_{20°\ C.}$ may be a cross-sectional area of the pipe 110 at which an intended resonant frequency $f_H$ is output when the internal temperature $T_{enclosure}$ of the housing 100 is 20° C. A cross-section change amount ΔA of the pipe 110 required when the internal temperature $T_{enclosure}$ of the housing 100 is not 20° C. may be expressed by Equation 5 by modifying Equation 1.

$$\Delta A = \left(\left(\frac{v_{20°\ C.}}{v_{T_{enclosure}}}\right)^2 - 1\right) A_{20°\ C.} \quad \text{[Equation 5]}$$

In other words, based on the basic port cross-sectional area $A_{20°\ C.}$, the basic sound velocity v20° C., the estimated internal temperature $T_{enclosure}$ of the housing 100, and Equation 5, the corresponding cross-sectional area change amount ΔA of the pipe 110 may be identified.

Therefore, the cross-sectional area change amount ΔA of the pipe 110 corresponding to the internal temperature $T_{enclosure}$ of the housing 100 may be set in advance as a value found through tests during the development process. That is, the cross-sectional area change amount ΔA of the pipe 110 corresponding to the internal temperature $T_{enclosure}$ of the housing 100 may be stored in the memory in advance. The controller 230 may determine the cross-sectional area change amount ΔA of the pipe 110 corresponding to the internal temperature $T_{enclosure}$ of the housing 100 based on the internal temperatures of the housing 100 and the values stored in the memory. The controller 230 may control the driving part 240 to change the cross-sectional area A of the pipe 110 having the basic port cross-sectional area $A_{20°\ C.}$ by the cross-sectional area change amount ΔA.

Referring to FIG. 5A, when the internal temperature $T_{enclosure}$ of the housing 100 is 20° C., at least one of the screen 130 or the cover 140 may be located at a basic position and the cross-sectional area A of the pipe 110 may be the basic port cross-sectional area $A_{20°\ C.}$. When the internal temperature $T_{enclosure}$ of the housing 100 is less than 20° C., the cross-sectional area A of the pipe 110 needs to increase by the cross-sectional area change amount ΔA of the pipe 110 corresponding to the internal temperature $T_{enclosure}$ to maintain the resonant frequency $f_H$ the same. In particular, the controller 230 may be configured to operate the driving part 240 to increase the cross-sectional area A of the pipe 110 having the basic port cross-sectional area $A_{20°\ C.}$ by the cross-sectional area change amount ΔA.

Referring to FIG. 5B, when the internal temperature of the housing 100 exceeds 20° C., the cross-sectional area A of the pipe 110 needs to decrease by the cross-sectional area change amount ΔA of the pipe 110 corresponding to the internal temperature $T_{enclosure}$ of the housing 100 so that the resonant frequency $f_H$ may be maintained the same. In particular, the controller 230 may operate the driving part 240 to decrease the cross-sectional area A of the pipe 110 having the basic port cross-sectional area $A_{20°\ C.}$ by the cross-sectional area change amount ΔA.

Figure 6:
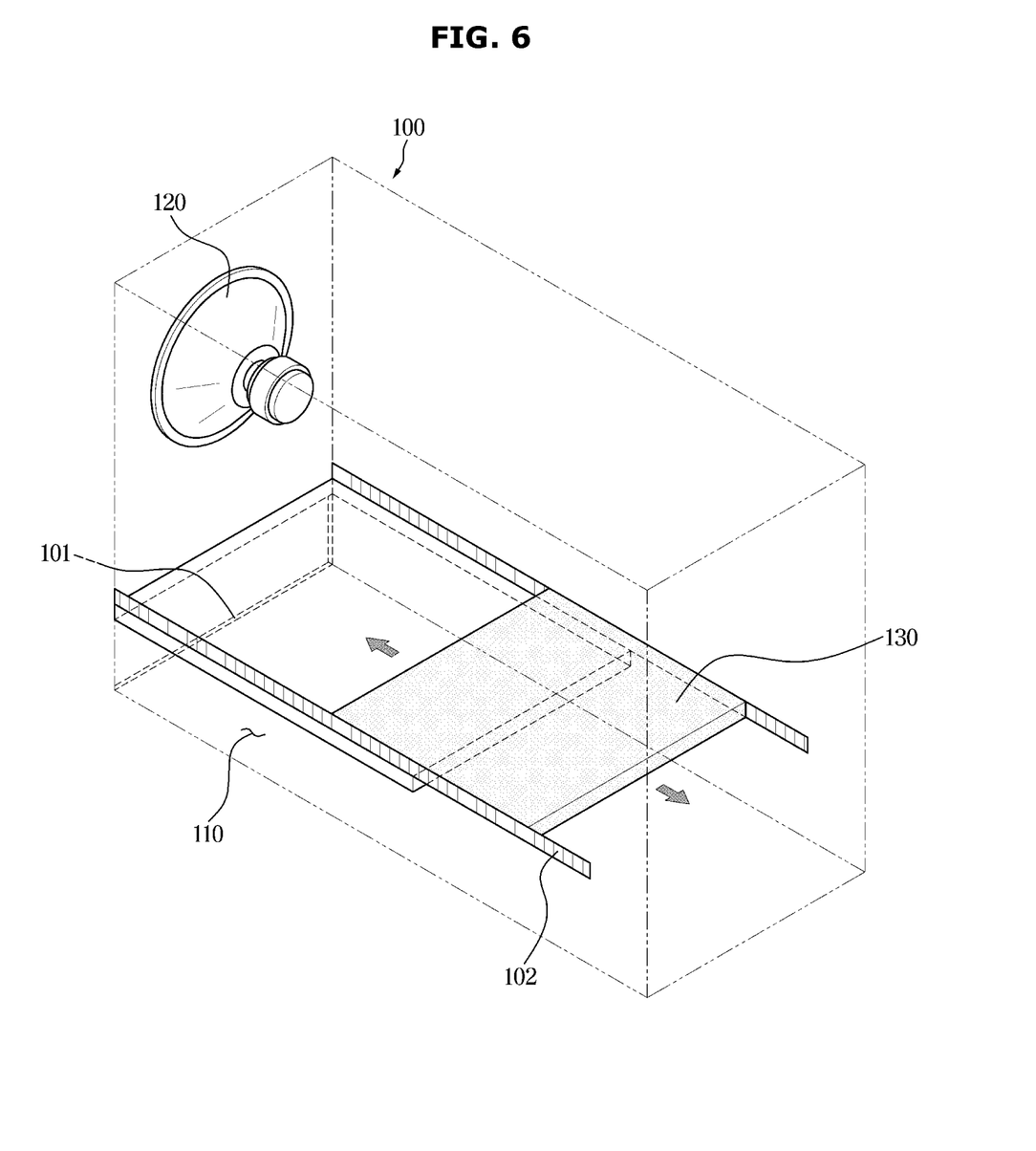
FIG. 6 is a view illustrating an embodiment in which the length of a pipe is adjusted using a screen.
Figure 7:
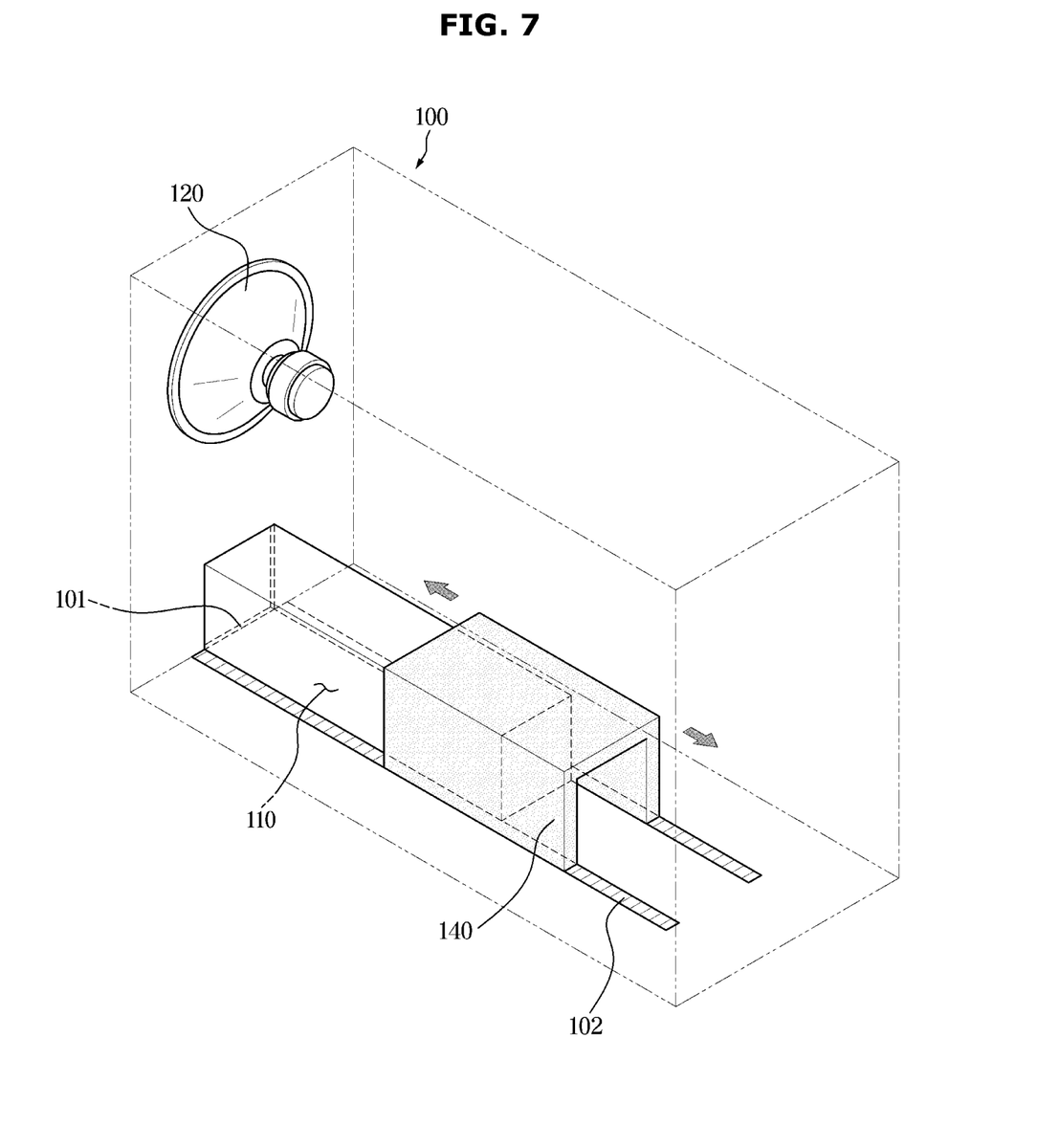
FIG. 7 is a view illustrating an embodiment in which the length of a pipe is adjusted using a cover.
Figure 8:
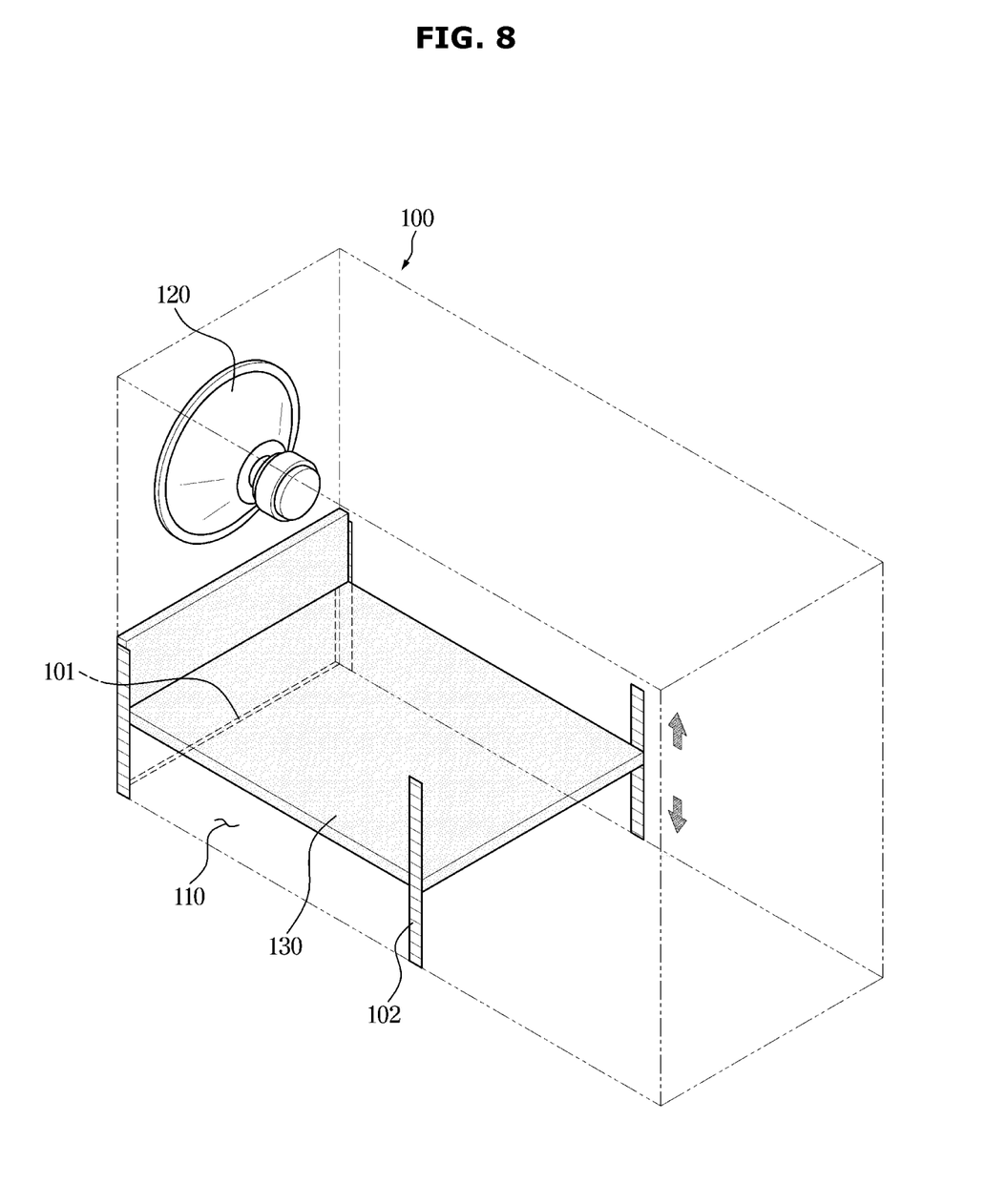
FIG. 8 is a view illustrating an embodiment in which the cross-sectional area of a pipe is adjusted using a screen.
Figure 9:
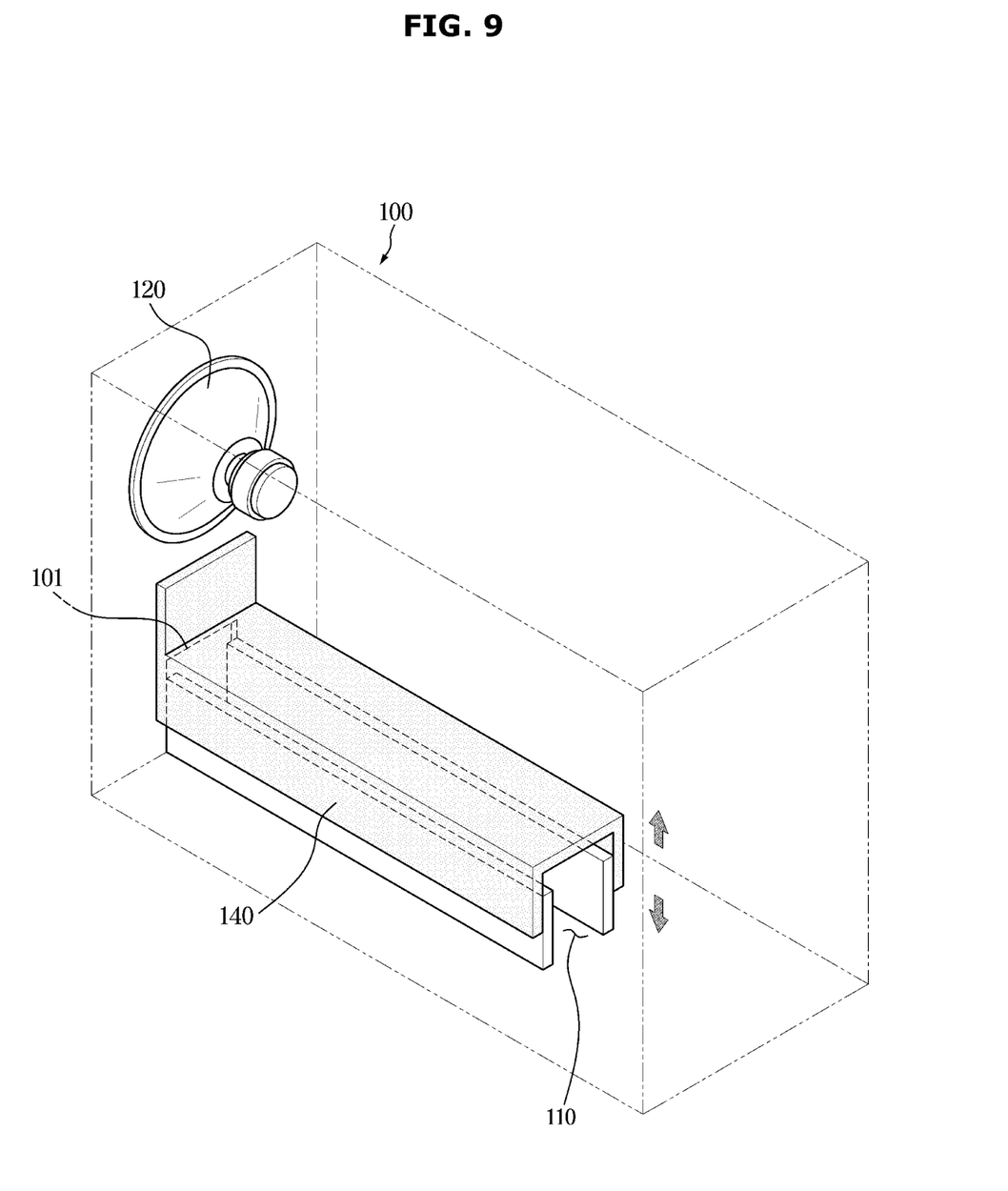
FIG. 9 is a view illustrating an embodiment in which the cross-sectional area of a pipe is adjusted using a cover.

Meanwhile, although the above-described example is illustrated based on a case where the internal temperature $T_{enclosure}$ of the housing 100 is 20° C., this is only an example, and examples using other temperatures as a reference may be possible. FIG. 6 is a view illustrating an embodiment in which the length of a pipe is adjusted using a screen, FIG. 7 is a view illustrating an embodiment in which the length of a pipe is adjusted using a cover, FIG. 8 is a view illustrating an embodiment in which the cross-sectional area of a pipe is adjusted using a screen, and FIG. 9 is a view illustrating an embodiment in which the cross-sectional area of a pipe is adjusted using a cover. In FIGS. 6, 7, and 8, the cross-sectional area A of the pipe 110 and the area of the hole 101 are equal to each other.

Referring to FIGS. 6, 7 and 8, a transport rail 102 may move at least one of the screen 130 or the cover 140 based on a driving force provided from the driving part 240. Various configurations may be adopted to move at least one of the screen 130 or the cover 140 with the transport rail 102 even when a small force is applied to the screen 130. As an example, the transport rail 102 may include a plurality of rollers.

When the transport rail 102 moves at least one of the screen 130 or the cover 140 based on the driving force provided from the driving part 240, the transport rail 102 may be formed of a material having a great frictional force or may include a fixing part capable of fixing a part of at least one of the screen 130 or the cover 140. In other words, the transport rail 102 may serve as a conveyor of a conveyor system. The transport rail 102 may receive a driving force from the driving part 240, and at least one of the screen 130 or the cover 140 may move based on the driving force. The driving part 240 may be configured to move at least one of the screen 130 or the cover 140 based on a control signal of the controller 230.

Specifically, the driving part 240 may include a driving motor configured to generate a driving force to various configurations for moving at least one of the screen 130 or the cover 140 and a driving circuit configured to supply driving power to the driving motor according to a control signal of the controller 230. The driving motor may be configured to receive driving power from the driving circuit and convert the supplied driving power into rotational force. According to an embodiment, the transport rail 102 may be moved in the horizontal direction by the rotational force of the driving motor.

For example, the rotational force generated by the driving motor may be transmitted to the transport rail 102 through a gear or the like. In other words, the driving motor may be configured to move the transport rail 102 through a gear or the like. As another example, the rotational force generated by the driving motor may be transmitted to the transport rail 102 through a fluid and a piston. Such a driving circuit may include a switching element, such as a relay, for supplying driving power to the driving motor or blocking the driving power. The configuration for moving at least one of the screen 130 or the cover 140 is not limited to the above-described example, and various techniques within the range of conventional techniques may be employed.

Referring to FIG. 6, the housing 100 may include a screen 130 provided inside the housing 100 to move in a direction parallel to the bottom surface of the housing 100. In particular, the screen 130 may be arranged inside the housing 100 to have a first side thereof in close contact with the left side surface of the housing 100 and a second side thereof in close contact with the right side surface of the housing 100. In other words, the pipe 110 may include the left side surface of the housing 100, the right side surface of the housing 100, the bottom surface of the housing 100, and the screen 130. Particularly, when the screen 130 moves in a direction parallel to the bottom surface of the housing 100, the length L of the pipe 110 may be changed.

The transport rail 102 may be installed inside the housing 100 to move the screen 130 in the front direction or the rear direction of the housing 100. In particular, a portion of the screen 130 may be in contact with the transport rail 102. The transport rail 102 may move the screen 130 in the front direction or the rear direction of the housing 100 based on the driving force provided from the driving part 240, or in response to a horizontal force applied to the screen 130, move the screen 130 in the front direction or the rear direction of the housing 100.

When a force in a direction parallel to the bottom surface of the housing 100 acts on the screen 130 by the transport rail 102, the screen 130 may be moved more easily in the horizontal direction. When the screen 130 moves in the front direction of the housing 100, the length L of the pipe 110 is shortened, and when the screen 130 is moved in the rear direction of the housing 100, the length L of the pipe 110 may be lengthened. The controller 230 may be configured to operate the driving part 240 to move the screen 130 in the front or rear direction so that the length L of the pipe 110 becomes an appropriate length corresponding to the internal temperature $T_{enclosure}$ of the housing 100.

Referring to FIG. 7, the housing 100 may include a cover 140 provided inside the housing 100 to be movable in a direction parallel to the bottom surface of the housing 100. The pipe 110 may include the bottom surface of the housing 100 and the cover 140. In particular, when the cover 140 is moved in the direction parallel to the bottom surface of the housing 100, the length L of the pipe 110 may be changed.

The transport rail 102 may be installed inside the housing 100 to move the cover 140 in the front direction or the rear direction of the housing 100. Particularly, a portion of the cover 140 may be in contact with the transport rail 102. The transport rail 102 may move the cover 140 in the front direction or the rear direction of the housing 100 based on the driving force provided from the driving part 240, or in response to a horizontal force applied to the cover 140, move the cover 140 in the front direction or the rear direction of the housing 100.

When a force in a direction parallel to the bottom surface of the housing 100 acts on the cover 140 by the transport rail 102, the cover 140 may be moved more easily in the horizontal direction. When the cover 140 moves in the front direction of the housing 100, the length L of the pipe 110 is reduced, and when the cover 140 moves in the rear direction of the housing 100, the length of the pipe 110 L is increased. The controller 230 may be configured to operate the driving part 240 to move the cover 140 in the front or rear direction so that the length L of the pipe 110 becomes an appropriate length corresponding to the internal temperature $T_{enclosure}$ of the housing 100.

Referring to FIG. 6, the housing 100 may include a screen 130 provided inside the housing 100 to be movable in a direction perpendicular to the bottom surface of the housing 100. In particular, the screen 130 may be disposed inside the housing 100 to have a first side in close contact with the left side surface of the housing 100 and a second side in close contact with the right side surface of the housing 100. In other words, the pipe 110 may include the left side surface of the housing 100, the right side surface of the housing 100, the bottom surface of the housing 100, and the screen 130. In particular, when the screen 130 moves in a direction perpendicular to the bottom surface of the housing 100, the cross-sectional area A of the pipe 110 may be changed.

The transport rail 102 may be installed inside the housing 100 to move the screen 130 in the upper surface direction or the lower surface direction of the housing 100. In particular, a portion of the screen 130 may be in contact with the transport rail 102. The transport rail 102 may move the screen 130 in the upper surface direction or the lower surface direction of the housing 100 based on the driving force provided from the driving part 240, or in response to a force in the vertical direction applied to the screen 130, move the screen 130 in the upper surface direction or the lower surface direction of the housing 100.

When a force in a direction perpendicular to the bottom surface of the housing 100 is applied to the screen 130 by the transport rail 102, the screen 130 may be moved more easily in the vertical direction. In FIG. 9, the cross-sectional area A of the pipe 110 and the area of the hole 101 are equal to each other. When the cross-sectional area A of the pipe 110 is changed, the area of the hole 101 is also changed. That is, the screen 130 moves in the upper surface direction of the housing 100, the cross-sectional area A of the pipe 110 increases, and when the screen 130 moves in the lower surface direction of the housing 100, the cross-sectional area A of the pipe 110 may be reduced. The controller 230 may be configured to operate the driving part 240 to move the screen 130 in the upper or lower direction so that the cross-sectional area A of the pipe 110 becomes an appropriate cross-sectional area corresponding to the internal temperature $T_{enclosure}$ of the housing 100

Referring to FIG. 9, the housing 100 may include a cover 140 provided inside the housing 100 to be movable in a direction perpendicular to the bottom surface of the housing 100. The pipe 110 may include the bottom surface of the housing 100 and the cover 140. In particular, when the cover 140 moves in a direction perpendicular to the bottom surface of the housing 100, the cross-sectional area A of the pipe 110 may be changed.

Although not shown, the transport rail 102 may be installed inside the housing 100 to move the cover 140 in the upper surface direction or the lower surface direction of the housing 100. In particular, a portion of the cover 140 may be in contact with the transport rail 102. The transport rail 102 may move the cover 140 in the upper surface direction or the lower surface direction of the housing 100 based on the driving force provided from the driving part 240, or in response to a force in the vertical direction applied to the cover 140, may move the cover 140 in the upper surface direction or the lower surface direction of the housing 100.

When a force in a direction perpendicular to the bottom surface of the housing 100 acts on the cover 140 by the transport rail 102, the cover 140 may be moved more easily in the vertical direction. When the cover 140 moves in the direction of the upper surface of the housing 100, the cross-sectional area A of the pipe 110 increases, and when the cover 140 moves in the direction of the lower surface of the housing 100, the cross-sectional area A of the pipe 110 may be reduced. The controller 230 may be configured to operate the driving part 240 to move the cover 140 in the upper or lower direction so that the cross-sectional area A of the pipe 110 becomes an appropriate cross-sectional area corresponding to the internal temperature $T_{enclosure}$ of the housing 100.

Figure 10:
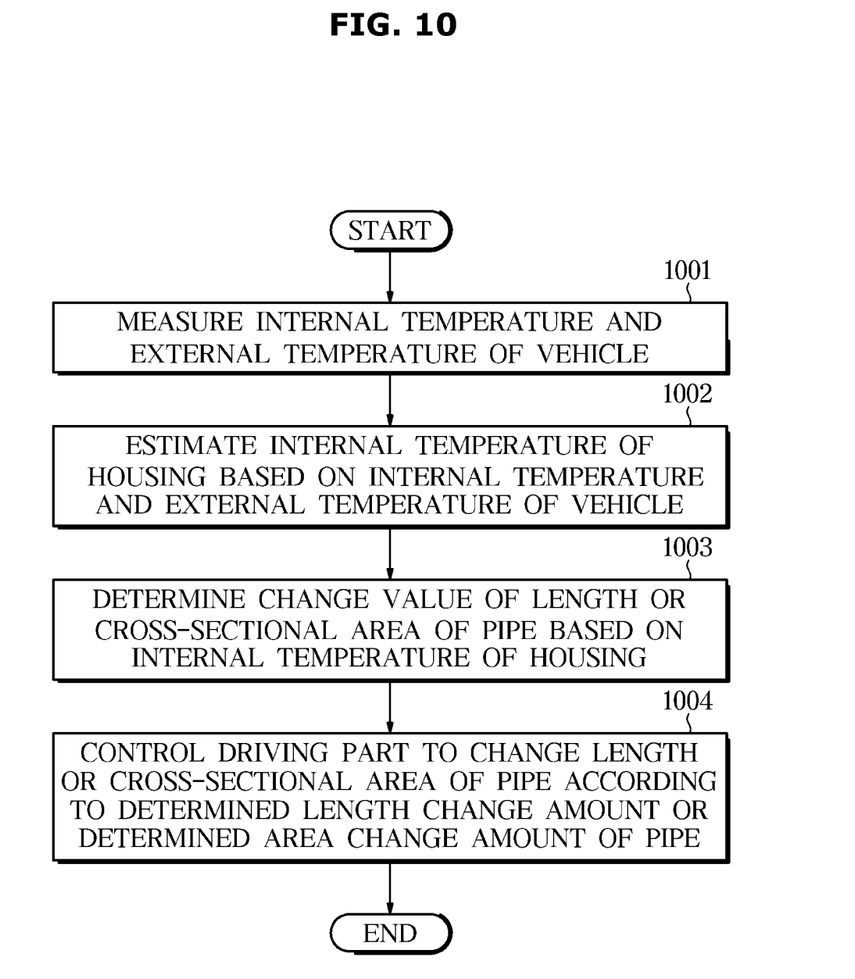
FIG. 10 is a view illustrating a procedure flow diagram according to an embodiment.

FIG. 10 is a view illustrating a procedure flow diagram according to an embodiment. This is only an exemplary embodiment for achieving the object of the present disclosure, and it should be understood some components may be added or deleted as needed. Referring to FIG. 10, the first sensor 210 may be configured to measure the external temperature of the vehicle 10, and the second sensor 220 may be configured to measure the internal temperature of the vehicle 10 (1001).

Particularly, the first sensor 210 may be configured to transmit external temperature information of the vehicle 10 to the controller 230, and the second sensor 220 may be configured to transmit internal temperature information of the vehicle 10 to the controller 230. The controller 230 may be configured to estimate the internal temperature $T_{enclosure}$ of the housing 100 based on the internal temperature $T_{inside}$ of the vehicle 10 and the external temperature $T_{outside}$ of the vehicle 10 (1002).

In addition, the controller 230 may be configured to estimate the internal temperature $T_{enclosure}$ of the housing 100 as an average value obtained by assigning appropriate weights to the internal temperature $T_{inside}$ of the vehicle 10 and the external temperature $T_{outside}$ of the vehicle 10. In other words, the controller 230 may be configured to estimate the internal temperature $T_{enclosure}$ of the housing 100 based on the external temperature $T_{enclosure}$ of the vehicle 10 measured by the first sensor 210, the internal temperature $T_{inside}$ of the vehicle 10 measured by the second sensor 220, the weight α, and Equation 3.

The controller 230 may be configured to determine a change value of the length L or the cross-sectional area A of the pipe 110 based on the internal temperature $T_{enclosure}$ of the housing 100 (1003). In other words, the controller 230 may be configured to determine the length change amount ΔL of the pipe 110 corresponding to the internal temperature $T_{enclosure}$ of the housing 100 or the cross-sectional area changed amount ΔA corresponding to the internal temperature $T_{enclosure}$ of the housing 100, based on the internal temperatures $T_{enclosure}$ of the housing 100 and the values stored in the memory.

The controller 230 may be configured to operate the driving part 240 to change the length L of the pipe 110 or the cross-sectional area A of the pipe 110 according to the determined length change amount ΔL of the pipe 110 or the determined cross-sectional area change amount ΔA of the pipe 110 (1004). In particular, the changing of the length L of the pipe 110 and the cross-sectional area A of the pipe 110 may include moving at least one of the screen 130 or the cover 140 provided inside the housing 100 of the housing 100 in a direction parallel to or perpendicular to the bottom surface.

In addition, the moving of the at least one of the screen 130 or the cover 140 may include using the moving rail 102. However, the changing of the length L of the pipe 110 and the cross-sectional area A of the pipe 110 is not limited to the method of using at least one of the screen 130, the cover 140, or the moving rail 102, various techniques within the scope of ordinary skill may be employed. The controller 230 may be configured to operate the driving part 240 to change the shape of the pipe 110 to have an appropriate length L of the pipe 110 and cross-sectional area A of the pipe 110 corresponding to the internal temperature of the housing 100 so that the housing 100 and the speaker 120 achieve optimum performance regardless of the temperature condition.

As is apparent from the above, the vehicle and the method of controlling the same can estimate the internal temperature of an enclosure provided in the vehicle, and change at least one of a length or a cross-sectional area of a port of the enclosure according to the internal temperature of the enclosure. That is, according to an aspect of the disclosure, the vehicle and the method of controlling the same can adjust the port to have an appropriate length or cross-sectional area according to the internal temperature of the enclosure so that the enclosure provides optimum performance.

Although embodiments of the present disclosure have been described for illustrative purposes, those skilled in the art will appreciate that various modifications, additions and substitutions are possible, without departing from the scope and spirit of the disclosure. Therefore, embodiments of the present disclosure have not been described for limiting purposes.

What is claimed is:

1. A vehicle comprising:
   a first sensor configured to measure an external temperature of the vehicle;
   a housing;
   a speaker provided inside the housing and arranged to face an opening formed at one surface of the housing;
   a pipe provided in the housing and arranged to have an opening thereof face a hole formed at the one surface of the housing;
   a driving part configured to change a volume of the pipe; and
   a controller configured to operate the driving part to change the volume of the pipe based on the external temperature of the vehicle.

2. The vehicle of claim 1, further comprising a second sensor configured to measure an internal temperature of the vehicle, wherein the controller is configured to operate the driving part to change the volume of the pipe based on the internal temperature of the vehicle.

3. The vehicle of claim 2, wherein the controller is configured to estimate an internal temperature of the housing based on the external temperature of the vehicle and the internal temperature of the vehicle, and operate the driving part to change the volume of the pipe based on the estimated internal temperature of the housing.

4. The vehicle of claim 2, wherein the controller is configured to operate the driving part to change the length of the pipe based on at least one of the external temperature of the vehicle or the internal temperature of the vehicle.

5. The vehicle of claim 4, further comprising
a screen arranged inside the housing to have a first side in proximate contact with a left side surface of the housing and a second side in proximate contact with a right side surface of the housing,
wherein the pipe includes the left side surface of the housing, the right side surface of the housing, a bottom surface of the housing, and the screen,
the driving part moves the screen in a direction parallel to the bottom surface to change the length of the pipe, and
the controller is configured to operate the driving part to move the screen based on at least one of the external temperature of the vehicle or the internal temperature of the vehicle.

6. The vehicle of claim 4, further comprising
a cover provided inside the housing to be movable in a direction parallel to a bottom surface of the housing,
wherein the pipe includes the bottom surface and the cover,
wherein the driving part moves the cover such that the length of the pipe is changed, and
wherein the controller is configured to operate the driving part to move the cover based on at least one of the external temperature of the vehicle or the internal temperature of the vehicle.

7. The vehicle of claim 1, wherein the controller is configured to operate the driving part to change a cross-sectional area of the pipe based on at least one of the external temperature of the vehicle or the internal temperature of the vehicle.

8. The vehicle of claim 7, further comprising
a screen arranged inside the housing to have a first side in proximate contact with a left side surface of the housing and a second side in proximate contact with a right side surface of the housing,
wherein the pipe includes the left side surface of the housing, the right side surface of the housing, a bottom surface of the housing, and the screen,
wherein the driving part moves the screen in a direction perpendicular to the bottom surface so that the cross-sectional area of the pipe is changed, and
wherein the controller is configured to operate the driving part to move the screen based on at least one of the external temperature of the vehicle or the internal temperature of the vehicle.

9. The vehicle of claim 7, further comprising
a cover provided inside the housing to be movable in a direction perpendicular to a bottom surface of the housing,
wherein the pipe includes the bottom surface and the cover,
wherein the driving part moves the cover such that the cross-sectional area of the pipe is changed, and
wherein the controller is configured to operate the driving part to move the cover based on at least one of the external temperature of the vehicle or the internal temperature of the vehicle.

10. A method of controlling a vehicle including a housing, a speaker provided inside the housing and arranged to face an opening formed at one surface of the housing, and a pipe provided in the housing and arranged to have an opening thereof face a hole formed at the one surface of the housing, the method comprising:

measuring, by a sensor, an external temperature of the vehicle; and
operating, by a controller, a driving part to change a volume of the pipe based on the external temperature of the vehicle.

11. The method of claim 10, further comprising measuring an internal temperature of the vehicle, wherein the operating of the driving part to change the volume of the pipe includes operating the driving part to change the volume of the pipe based on the internal temperature of the vehicle.

12. The method of claim 11, wherein the operating of the driving part to change the volume of the pipe includes estimating an internal temperature of the housing based on the external temperature of the vehicle and the internal temperature of the vehicle, and operating the driving part to change the volume of the pipe based on the estimated internal temperature of the housing.

13. The method of claim 10, wherein the operating of the driving part to change the volume of the pipe includes operating the driving part to change the length of the pipe based on the external temperature of the vehicle.

14. The method of claim 13, wherein the vehicle further comprises:
a screen arranged inside the housing to have a first side in proximate contact with a left side surface of the housing and a second side in proximate contact with a right side surface of the housing,
wherein the pipe includes the left side surface of the housing, the right side surface of the housing, a bottom surface of the housing, and the screen,
wherein the driving part moves the screen in a direction parallel to the bottom surface so that the length of the pipe is changed, and
wherein the operating of the driving part to change the length of the pipe includes operating the driving part to move the screen based on the external temperature of the vehicle.

15. The method of claim 13, wherein the vehicle further comprises
a cover provided inside the housing to be movable in a direction parallel to a bottom surface of the housing,
wherein the pipe includes the bottom surface and the cover,
wherein the driving part moves the cover to change the length of the pipe, and
wherein the operating of the driving part to change the length of the pipe includes operating the driving part to move the cover based on the external temperature of the vehicle.

16. The method of claim 10, wherein the operating of the driving part to change the volume of the pipe includes operating the driving part to change a cross-sectional area of the pipe based on the external temperature of the vehicle.

17. The method of claim 16, wherein the vehicle further comprises
a screen arranged inside the housing to have a first side in proximate contact with a left side surface of the housing and a second side in proximate contact with a right side surface of the housing,
wherein the pipe includes the left side surface of the housing, the right side surface of the housing, a bottom surface of the housing, and the screen,
wherein the driving part moves the screen in a direction perpendicular to the bottom surface to change the cross-sectional area of the pipe, and
wherein the controlling of the cross-sectional area of the pipe includes controlling the driving part to move the screen based on the external temperature of the vehicle.

18. The method of claim 16, wherein the vehicle further comprises
   a cover provided inside the housing to be movable in a direction perpendicular to a bottom surface of the housing,
   wherein the pipe includes the bottom surface and the cover,
   wherein the driving part moves the cover to change the cross-sectional area of the pipe, and
   wherein the operating of the driving part to change the cross-sectional area of the pipe includes operating the driving part to move the cover based on the external temperature of the vehicle.

* * * * *